United States Patent [19]

Hatfield

[11] 4,329,678
[45] May 11, 1982

[54] METHOD AND APPARATUS FOR REMOTELY CONTROLLING AN ELECTRICAL APPLIANCE

[76] Inventor: Jerry M. Hatfield, 6408 La Cumbre Rd., Camarillo, Calif. 93010

[21] Appl. No.: 133,559

[22] Filed: Mar. 24, 1980

[51] Int. Cl.³ .............................................. H04B 3/54
[52] U.S. Cl. ................................. 340/310 A; 307/140; 340/310 CP
[58] Field of Search ........ 340/310 R, 310 A, 310 CP, 340/151, 152 R, 152 T, 167 R, 167 B, 538; 307/3, 140, 149; 375/23, 36, 37, 44, 67, 71, 78, 83

[56] References Cited

U.S. PATENT DOCUMENTS

| | | | |
|---|---|---|---|
| 3,011,102 | 11/1961 | Balan . | |
| 3,462,756 | 8/1969 | Mills | 340/310 R |
| 3,488,517 | 1/1970 | Cowan et al. | 307/3 |
| 3,590,271 | 6/1971 | Peters | 307/140 |
| 3,594,584 | 7/1971 | Woods | 307/3 |
| 3,689,886 | 9/1972 | Durkee | 340/310 A |
| 3,714,451 | 1/1973 | Whitney et al. | 340/310 R |
| 3,729,710 | 4/1973 | Sherwin | 340/310 A |
| 3,818,466 | 6/1974 | Honda | 340/310 R |
| 3,971,028 | 7/1976 | Funk | 340/310 A |
| 3,986,121 | 10/1976 | Oehrli | 340/310 A |
| 4,163,219 | 7/1979 | Kato | 340/310 A |

Primary Examiner—James J. Groody
Attorney, Agent, or Firm—Christie, Parker & Hale

[57] ABSTRACT

A transmitter (12) has an output (13) adapted to be connected across an alternating current power line (AC1, AC2) at a point remote from an appliance (24) to be controlled. The transmitter generates one pulse per cycle of the alternating current. The pulse phase has a predetermined value with respect to the alternating current. A receiver (21) is adapted to be connected across the power line to couple the line to the appliance. When the receiver detects transmitter generated pulses during phase windows occurring each alternating current cycle, power is applied from the line to the appliance for the remainder of such alternating current cycle. The transmitter has an adjustment (14) that permits the phase of the transmitter generated pulses to be modulated and the receiver has an adjustment (26) that permits the position of the phase windows relative to the alternating current to be changed. The transmitter generated pulses and the phase windows occur only on every other half cycle of the alternating current. The transmitter includes a controlled rectifier which is fired on every other half cycle of the alternating current to generate the transmitter pulses; after firing, the controlled rectifier remains in a conducting state during the remainder of the alternating current half cycle.

26 Claims, 8 Drawing Figures

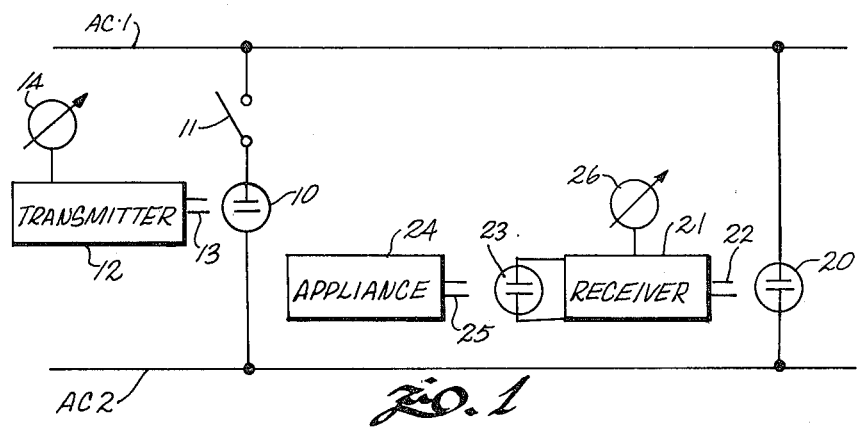
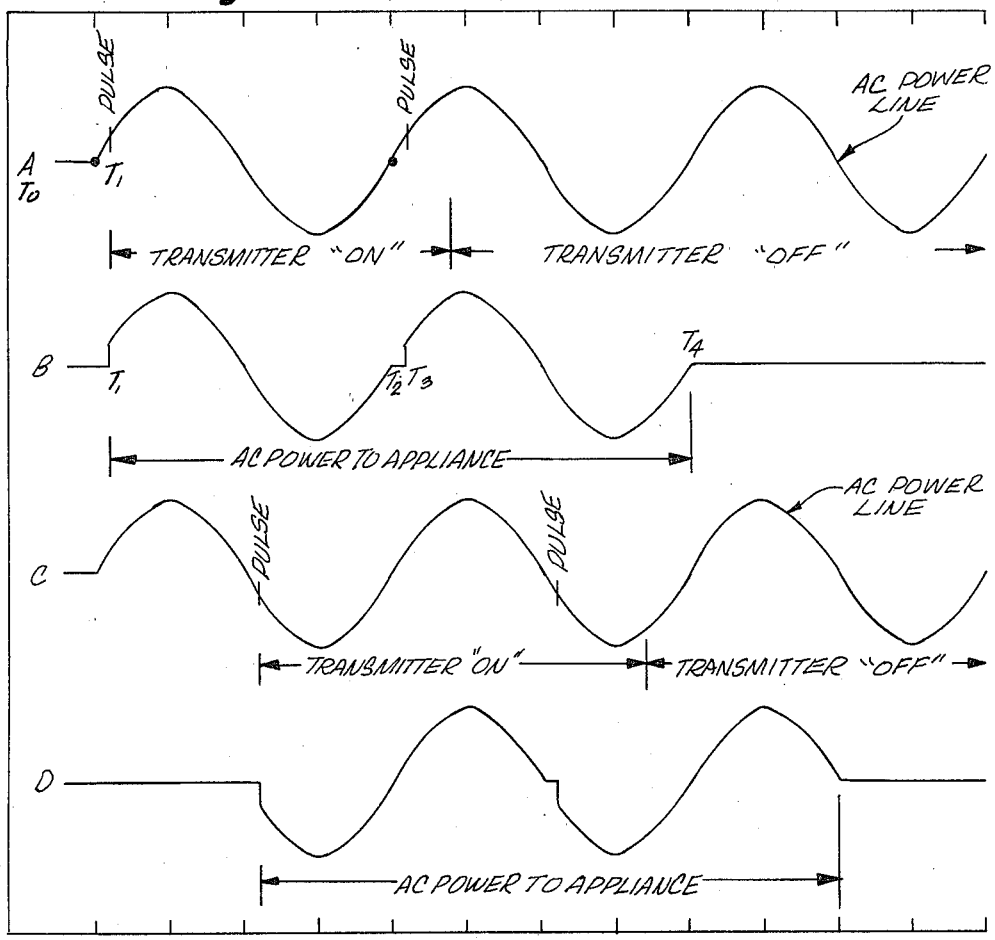

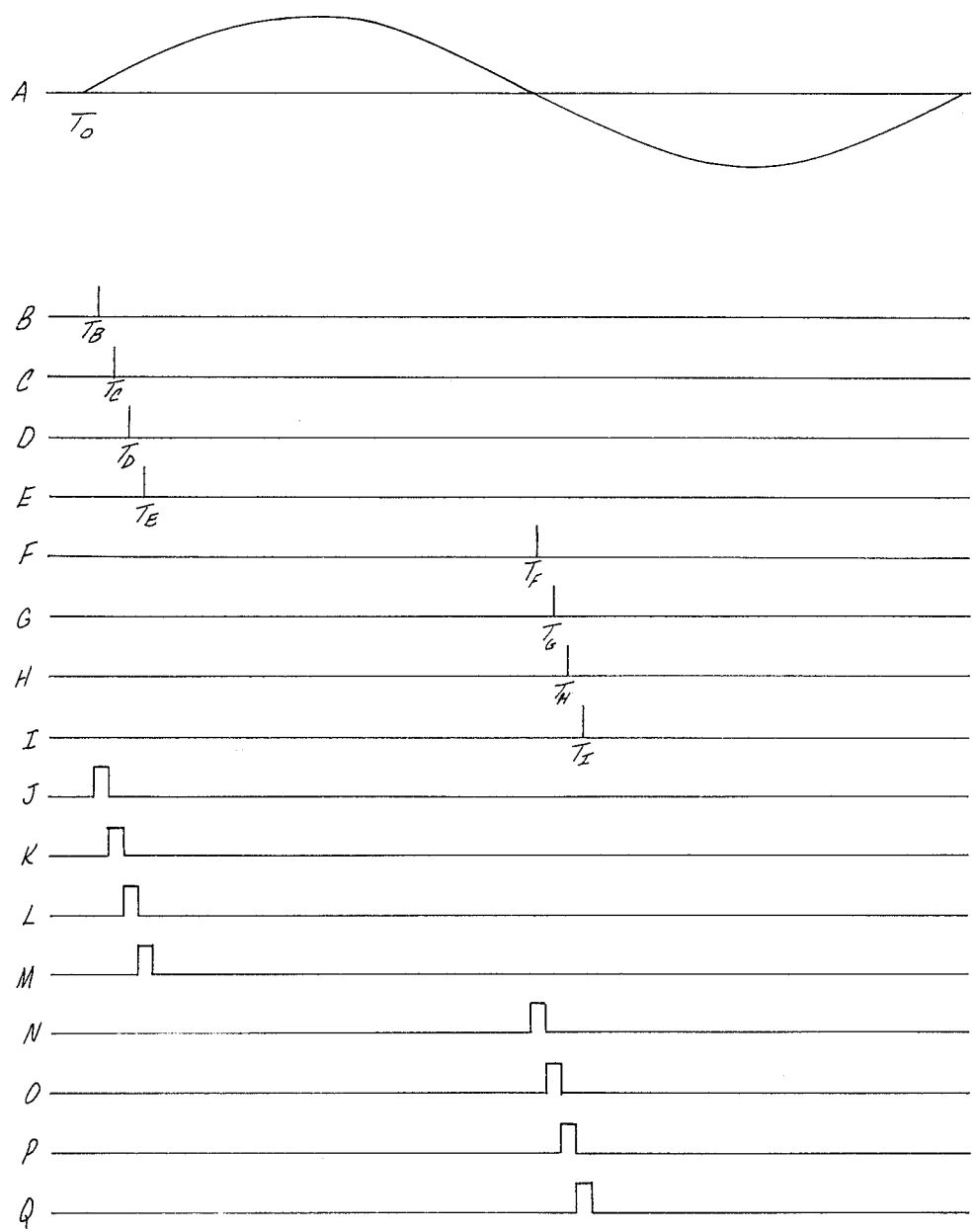

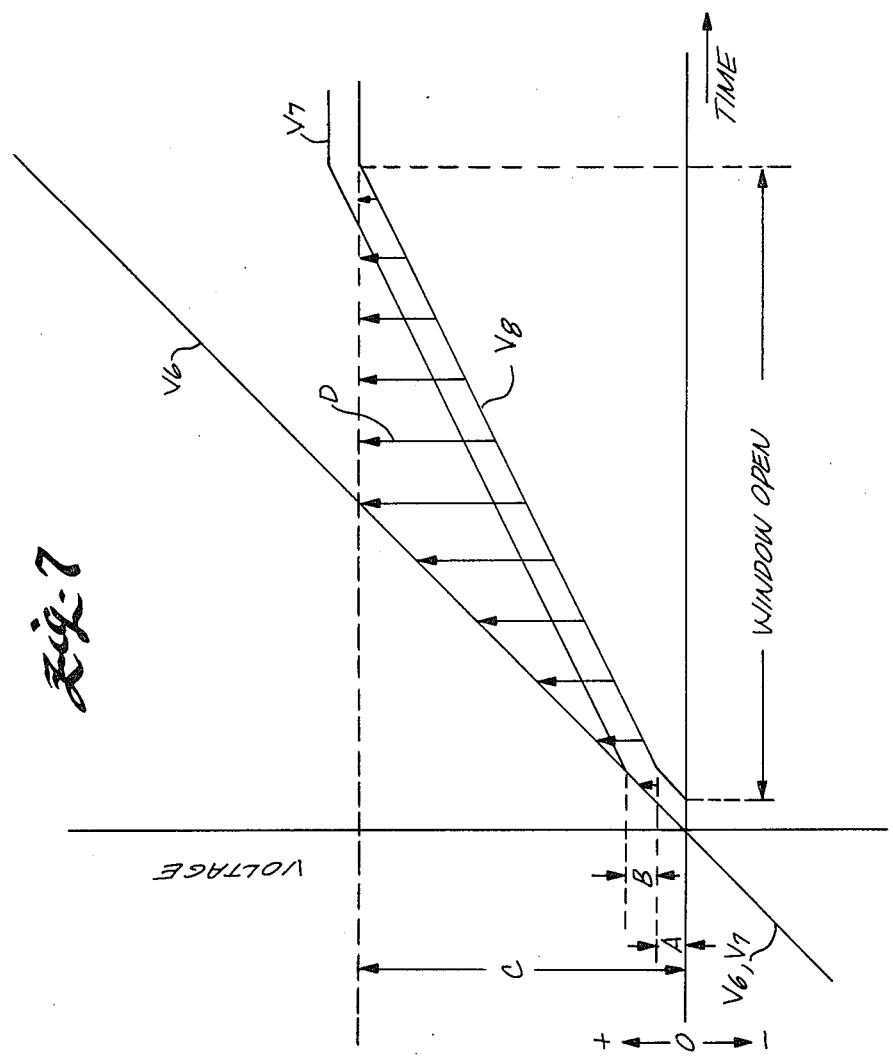

METHOD AND APPARATUS FOR REMOTELY CONTROLLING AN ELECTRICAL APPLIANCE

BACKGROUND OF THE INVENTION

This invention relates to electrical power control and, more particularly, to a method and apparatus for remotely controlling an electrical appliance connected across an electrical power line.

It is often desirable to remotely control an appliance connected to an electrical outlet. If the plan for such remote control is known before the electrical wiring is installed, wall switches can be provided at the appropriate locations to control application of electrical power to the outlets to which the appliances are to be connected. If the user of the building wishes to establish a plan for remote control of appliances after the electrical wiring is in place, there are known techniques for signalling a switch at the appliance over the existing electrical wiring to turn the appliance on and off.

One such technique described in Durkee U.S. Pat. No. 3,689,886 transmits one of a plurality of high frequency tone signals over power lines to control an electrical appliance; each frequency represents a separate control channel. A filter is provided for each remote switch to select the frequency corresponding to the particular channel. The filtered tone signal received at a remote switch is rectified and integrated to produce a switch actuating signal. Durkee uses time division multiplexing to increase the effective number of channels. The total number of channels is the product of the number of different frequency tone signals and the number of time slot divisions. In addition to the likelihood that high frequency tone signals will interfere with communication equipment such as radio and television connected to the power line, Durkee's technique has the shortcomings normally associated with high frequency equipment such as high cost, instability, and lack of reliability.

Another technique disclosed in Woods U.S. Pat. No. 3,594,584 uses for signalling periodic pulses at a frequency several times higher than the line frequency and in no particular phase relationship to the alternating current. At the remote outlets, the pulses are rectified and integrated to produce a switch actuating signal. Woods only makes provision for one control channel, which severely limits the usefulness of his technique, and his switch is susceptible to accidental actuation by spurious signals and noise on the power line.

SUMMARY OF THE INVENTION

According to the invention, an electrical appliance connected across an alternating current power line is remotely controlled by pulses occurring at the frequency of the alternating current. A transmitter has an output adapted to be connected across an alternating current power line at a point remote from an appliance to be controlled. The transmitter generates one pulse per cycle of the alternating current. A characteristic of the transmitter generated pulses has a predetermined value. A receiver is adapted to be connected across the alternating current power line to couple the line to the appliance. Responsive to the transmitter generated pulses, the receiver transfers power from the line to the appliance as a function of the characteristic of the pulses. Preferably, the characteristic is the phase of the generated pulses relative to the alternating current on the line and the receiver applies power from the line to the appliance only when the phase of the transmitter generated pulses is the predetermined value.

It is particularly advantageous to use phase as the pulse characteristic of the transmitter generated pulses because the transmitter and receiver can be synchronized by the zero crossings of the alternating current on the line. Specifically, a time delay circuit at the transmitter controls the generation of pulses so as to produce a pulse a predetermined time after every other zero crossing of the alternating current and another time delay circuit at the receiver controls the start of time slots during which the receiver can respond to pulses on the line so such time slots begin a predetermined time after every other zero crossing of the alternating current. The time slots embrace the transmitter generated pulses, thereby causing the receiver to be insensitive to noise and pulses outside the time slot.

A feature of the invention is establishment of different signalling channels on the power line by modulating the pulse characteristic. Specifically, the pulse characteristic has a different predetermined value for each channel. When the pulse characteristic is phase, some of the transmitters and receivers connected across the power line can communicate with each other to the exclusion of other transmitters and receivers connected across the line by means of pulses occurring a predetermined time after alternate zero crossings of the alternating current. A particular transmitter or transmitters initiating the communication generate pulses having such time relationship to the alternating current and a particular receiver or receivers respond to pulses having such time relationship to the alternating current while the remaining receivers do not.

Another feature of the invention is the provision of transmitters and receivers that generate and respond respectively to pulses during only one-half cycle of the alternating current. By switching the polarity of connection of the transmitters and receivers to the power line, the number of channels can be doubled, vis-a-vis, the number of predetermined values of the pulse characteristic.

Another feature of the invention is the provision of a transmitter that generates a trigger pulse during every other half cycle of the alternating current and a receiver including first and second switches connected in parallel and coupling the line to the appliance. The first switch comprises a controlled rectifier having a gate electrode. The controlled rectifier fires to conduct unilaterally during the remainder of a half cycle of alternating current when a transmitter generated trigger pulse is applied to the gate electrode. The second switch is closed during half cycles of the alternating current immediately following application of each trigger pulse to the gating electrode. This arrangement permits a simple and reliable circuit implementation of a transmitter and receiver having all of the above enumerated features.

BRIEF DESCRIPTION OF THE DRAWINGS

FIG. 1 is a block diagram of a system for remotely and selectively energizing an appliance in accordance with the invention;

FIG. 2 shows a number of wave forms illustrating operation of the system of FIG. 1;

FIG. 3 shows a plurality of transmitter generated pulses having different predetermined phase values and receiver enablement in synchronization with the respective pulses;

FIG. 7 is a graph of voltages at different nodes of the receiver of FIG. 5 as a function of time.

DETAILED DESCRIPTION

Figure 5:
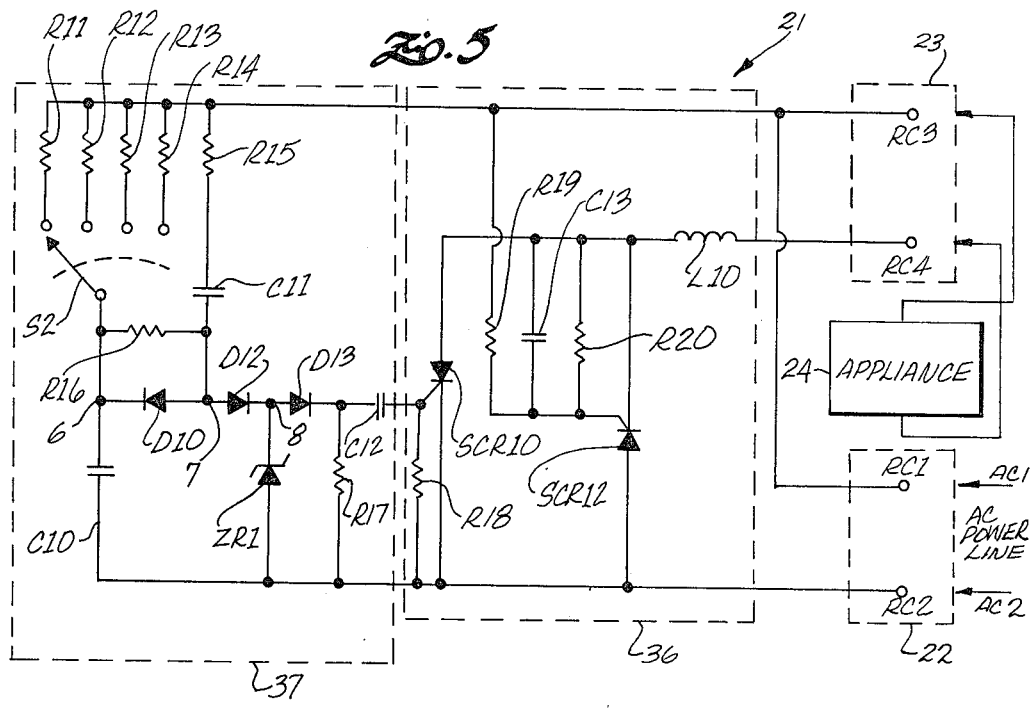
FIG. 5 is a circuit schematic diagram of the receiver of FIG. 1.

In FIG. 1, electrical conductors AC1 and AC2 comprise an alternating current power line carrying for example 110-volt or 220-volt, 60-cycle electrical power. An electrical wall socket 10 and a power switch 11, such as for example a conventional manually operated wall switch, are connected in series across the line, i.e., between conductors AC1 and AC2. Switch 11 has an open state and a closed state. A transmitter 12 is connected across the power line by a plug 13 inserted in socket 10. When switch 11 is closed, transmitter 12 receives power from the line and generates one pulse per cycle of the alternating current on the line, as described in more detail below in connection with FIG. 4. A characteristic of these pulses has a predetermined value. This characteristic is preferably the phase of the pulses relative to the alternating current on the line, but could be other characteristics such as for example pulse duration or amplitude. The predetermined value of the characteristic can be changed by an adjustment 14 such as for example a select switch or a potentiometer. By virtue of the connection through plug 13 and socket 10, the pulses generated by transmitter 12 are applied to the power line.

At a point along the power line remote from socket 10, switch 11, and transmitter 12, a wall socket 20 is connected across the power line, i.e., between conductors AC1 and AC2. A receiver 21 is connected across the power line by a plug 22 inserted in socket 20. Receiver 21 has a socket 23 connected in series with plug 22 through a normally open switching circuit described in more detail in connection with FIGS. 5 and 6. An electrical appliance 24 such as a lighting fixture, a television set, a coffee maker, or other device that consumes electrical power has a plug 25 that is inserted in socket 23 to connect appliance 24 across the line. The switching circuit of receiver 21 is actuated, i.e., closes, responsive to pulses on the line that have the characteristic, i.e., phase, with a predetermined value. The predetermined phase value to which receiver 21 responds can be changed by an adjustment 26, which could be for example a select switch or a potentiometer.

Conductors AC1 and AC2, socket 10, switch 11, and socket 20 are all part of a pre-existing power distribution system to which transmitter 12, receiver 21, and appliance 24 are connected by inserting plug 13 in socket 10, plug 22 in socket 20, and plug 25 in socket 23. Thus, appliance 24, which is connected in series with receiver 21 across the line at remote socket 20 can be controlled by operating switch 11 after transmitter 12 is connected in series therewith across the line. A number of additional transmitters and receivers can also be connected across the line to effect remote control of additional appliances. Separate signalling channels for such remote control can be established by selecting different predetermined values of the characteristic, i.e., phase, for different pairs or combinations of transmitters and receivers. In other words, the transmitter generated pulses are modulated, i.e., phase modulated, to selectively control specific receivers. Any transmitter and receiver combinations that are to operate together, are set by adjustments 14 and 26, respectively to the same predetermined value of the pulse characteristic, i.e., phase; the remaining receivers will not respond to pulses having this predetermined phase value and the remaining transmitters will not generate pulses having this predetermined phase value.

Referring now to FIG. 2, curve A shows a wave form of alternating current on a power line, including pulses generated by transmitter 12 in every other positive half cycle of the alternating current. Curve B shows the wave form of the alternating current power applied to appliance 24 when the switching circuit in receiver 21 is actuated responsive to the transmitter generated pulses. It is assumed that prior to time $T_0$, when the alternating current (AC) power is passing through its positive going zero crossing, no power is applied to appliance 24. At time $T_1$, which lags the positive going zero crossing by a relatively small amount, e.g., 10° or less, transmitter 12 generates a pulse and power is applied to appliance 24. As a result of the pulse at time $T_1$, power is applied to appliance 24 during the remainder of this half cycle of the AC power, as well as all of the following half cycle. When the AC power passes through its positive going zero crossing at time $T_2$, application of power to appliance 24 is terminated. At time $T_3$, which lags the positive going zero crossing by the same amount as $T_1$, another pulse is generated by transmitter 12 and power is reapplied to appliance 24 for the remainder of this half cycle and the following half cycle of AC power. If transmitter 12 is turned off by flipping switch 11 after time $T_3$, application of power to appliance 24 is terminated at the end of the following half cycle of AC power, designated time $T_4$. Curves C and D show the wave form of alternating current on the power line, including the transmitter generated pulses, and the wave form of the power applied to appliance 24, respectively, when the polarity of the terminals of plug 13 in socket 10 and of plug 22 in socket 20 are reversed. In this case, the transmitter generated pulses occur in every other negative half cycle of the AC power and power is applied to appliance 24 in phase lagging relationship to the negative half cycles of AC power.

Referring now to FIG. 3, which illustrates how separate signalling channels are established for different predetermined phase values of the transmitter generated pulses, curve A shows a single period of the AC power. In curves B through E, respectively, pulses $T_B$, $T_C$, $T_D$, and $T_E$, respectively, represent transmitter generated pulses having different predetermined phase values lagging progressively more the positive going zero crossing of the AC power at time $T_0$. In curves F through I, respectively, pulses $T_F$, $T_G$, $T_H$, and $T_I$, respectively, represent transmitter generated pulses having different predetermined phase values lagging progressively more the negative going zero crossing of the AC power at time $T_0$. For a particular setting of adjustment 14, transmitter 12 generates a pulse in each positive half cycle of the AC power, for example, pulse $T_B$, or a pulse in each negative half cycle of AC power, e.g., pulse $T_F$, depending upon the polarity of plug 13 relative to socket 10. In other words, this polarity sensitivity doubles the number of channels that can be established by phase modulating the transmitter generated pulses within every other half cycle of the AC power. The switching circuitry of each receiver is responsive only to transmitter generated pulses having a predetermined phase value or more properly, transmitter generated pulses occurring within a narrow phase, range, i.e., window, embracing the predetermined phase value of the transmitter generated pulses. The position of the phase window is set by adjustment 26. The phase windows that can be selected for receiver 21 are represented in curves J through M. As illustrated, the phase windows represented in curves J through M are synchronized with transmitter generated pulses $T_B$ through $T_E$, respectively, i.e., they embrace such pulses. For operation of a particular combination of transmitters and receivers together, the transmitter of transmitters are adjusted to generate pulses having a predetermined phase value, e.g., pulse $T_D$, of curve D, and the receiver or receivers are adjusted so their windows are aligned, i.e., synchronized with the transmitter generated pulses, e.g., curve L. In order to reposition the phase windows on the negative half cycles of AC power, it is only necessary to reverse the polarity of the terminals of plug 22 in socket 20. Of course, the polarity of a receiver in its socket must be the same as that of the transmitter to which it should respond.

Figure 4:
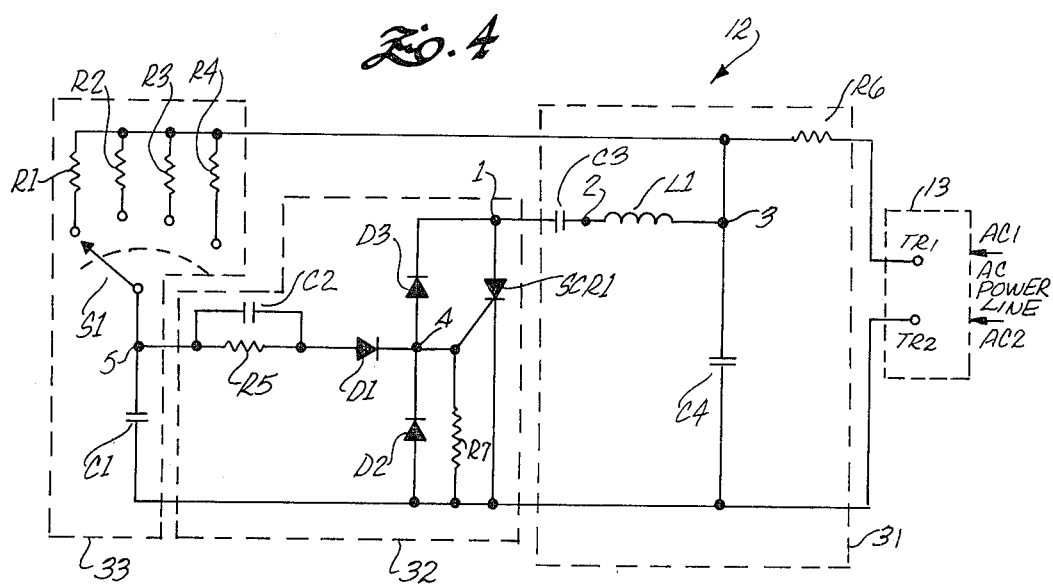
FIG. 4 is a circuit schematic diagram of the transmitter of FIG. 1.

Turning now to FIG. 4, transmitter 12 of FIG. 1 is shown in detail. Transmitter 12 basically consists of a resonant circuit 31, a thyristor pulse generating circuit 32, and a time delay trigger circuit 33, which functions as an adjustable phase shifting network. Transmitter 12 is connected across the AC power line by terminals TR1 and TR2 of plug 13. Plug 13 comprises terminals TR1 and TR2. A resistor R6, an inductor L1, a capacitor C3, and a controlled rectifier SCR1 are connected in series between TR1 and TR2. A capacitor C4 is connected from the junction of resistor R6 and inductor L1 to TR2. The wiper arm of a select switch S1 is connected by a timing capacitor C1 to TR2. Switch S1 has stationary contacts connected respectively by timing resistors R1, R2, R3, and R4 to the junction of resistor R6 and inductor L1. A coupling diode D1 is connected in series with the parallel combination of a holding resistor R5 and a coupling capacitor C2 between the wiper arm of switch S1 and the gate electrode of SCR1. A diode D2 and a voltage producing resistor R7 are connected in parallel between TR2 and the gate electrode of SCR1. A diode D3 is connected between the gate electrode of SCR1 and its anode. SCR1 is poled to transmit current from TR1 to TR2, D1 and D2 are poled to transmit current toward the gate electrode of SCR1, and D3 is poled to transmit current away from the gate electrode of SCR1. D2 and D3 are poled opposite to SCR1. The components in a typical embodiment of transmitter 10 are the following values and types:

R1 = 1000 ohms
D1,D2,D3 = HEP R0170
R2 = 3000 ohms
C1 = 0.1 mf
R3 = 4700 ohms
C2 = 0.02 mf
R4 = 10 K ohms
C3 = 0.1 mf
R5 = 33 K ohms
C4 = 0.1 mf
R6 = 47 ohms
L1 = 125 mh
R7 = 1000 ohms
SCR1 = HEP R1218

Transmitter generated pulses are produced by the timed discharge of the resonant circuit 31 across the AC power line when switch 11 is closed. During the negative half cycle of AC power, i.e., TR1 is negative with respect to TR2, controlled rectifier SCR1 is back biased and diodes D2 and D3 are forward biased. Accordingly, capacitor C3 is positively charged by the AC power through conductive diodes D2 and D3. The positive charge just described is measured across C3, i.e., between terminals 1 and 2 of the circuit of FIG. 4. The charging of capacitor C3 continues until the AC power reaches its negative peak. Additionally, during the negative half cycle, the voltage at node 5 of the transmitter is at a negative value thereby back biasing diode D1 and isolating SCR1 from the time delay circuit 33.

Figure 8:
FIG. 8 is an expansion of a portion of the time axis of waveform A in FIG. 2 showing a transmitter generated pulse in detail.

During the positive half cycle of the AC power, i.e., TR1 is positive with respect to TR2, node 5 commences to rise in voltage value towards the AC power at a rate determined by the time constant resulting from the capacitance of capacitor C1 and the resistance of a resistor selected from R1 through R4. The selection of a resistor R1 through R4 is by means of select switch S1, which comprises adjustment 14. The gate electrode of SCR1 is coupled to node 5 of transmitter 12 by a triggering circuit comprised of a series diode D1 and a network formed by the parallel connection of R5 and C2. SCR1 remains non-conductive as long as its gate electrode potential remains below its turn-on threshold voltage. At such time that the voltage at node 5 rises above the combined forward breakdown voltage of D1 and the turn-on threshold voltage of SCR1, SCR1 will be rendered conductive, i.e., it fires, thereby discharging resonant circuit 31 onto the AC power line. When SCR1 is rendered conductive, node 1 is placed at essentially ground potential. Capacitor C3 which was charged during the previous negative half cycle of AC power, is thus directly connected across terminals TR1 and TR2 and discharges through inductor L1 and resistor R6 into the powerline, thereby generating a pulse of the form shown in FIG. 8. Initially, the polarity of the pulse is negative, but inductor L1 causes the pulse polarity to swing positive after the initial negative excursion.

The delay circuit time constant and thus the time at which the voltage at node 5 exceeds the forward breakdown voltage of diode D1 and the turn on voltage of SCR1 is determined by the resistance value selected by select switch S1. Thus, select switch S1 sets the predetermined phase value of the transmitter generated pulses by selecting one of resistors R1 to R4. If the resistors, when going from R1 to R4, having increasing resistance values, the time delay or phase lag from the positive going zero crossing of AC power at which conduction of SCR1 occurs will accordingly increase. The time at which SCR1 turns on (predetermined by means of the selectable time constant of the time delay circuit) is measured with reference to the positive going zero crossing of the AC power. This is because SCR1 is rendered non-conductive when the AC power changes from the positive half cycle and commences the negative half cycle. It should be noted, however, that operation of the circuit is not restricted to the superposing of pulses on the positive half cycles and that by suitable circuit rearrangement, the voltage pulses may be superposed on the negative half cycles of the AC power. Specifically, the connection of terminals TR1 and TR2 to the AC power line is reversed.

As the voltage at node 5 reaches the forward breakdown potential of diode D1 current begins to flow through capacitor C2, diode D1 and resistor R7. This current increases rapidly to a value determined by the rate of change of the voltage at node 5. The result of this current passing through R7 is to produce a voltage at node 4 that tends to follow the voltage at node 5, reduced in amplitude by the forward voltage drop of diode D1. This voltage provides a stable triggering source for SCR1. A unique feature of the described SCR triggering circuitry is that it is relatively insensitive to gate electrode current variations that would otherwise cause variations in pulse timing, because C2 acts as a small impedance when current begins to flow through D1, thereby supplying large current to the gate electrode of SCR1. This current decreases as C2 charges, thereby limiting current flow at peak line voltage. Resistor R5 provides holding current, through D1 and D3, to maintain SCR1 in a conducting state until the end of the positive half cycle of the AC power as the circuit rings; during the subsequent negative half cycle R5 discharges capacitor C2 in preparation for the next pulse cycle. By keeping SCR1 conducting during the entire positive half cycle, the ringing, i.e., oscillations in C3 and L1 are permitted to decay sufficiently to prevent high frequency line interference.

Resistor R6 limits the surge current through SCR1, and capacitor C4 increases the voltage pulse width and reduces radio frequency interference (RFI) effects that may be generated due to the resonant circuit discharge. Once SCR1 is conductive, the gate electrode of SCR1 is coupled to ground through forward biased diode D3 and SCR1. Besides isolating the gate electrode during the negative half cycles of the AC power, D1 also serves to prevent a voltage buildup on capacitor C2 during the negative half cycles which would cause premature triggering, i.e., turning on of SCR1. Resistor R7 provides the gate to cathode impedance frequently specified for sensitive gate SCR's in order to prevent the SCR from turning itself on at high anode to cathode voltages.

Referring now to FIG. 5, receiver 21 is shown in detail. The receiver 21 basically consists of plug 22 that couples the receiver to the AC power line, socket 23 that couples the receiver to appliance 24, a controlled rectifier thyristor switching circuit 36 and a delay and enabling circuit 37. The receiver 21 is coupled to the AC power line by terminals RC1 and RC2 of plug 22 and is coupled to appliance 24 by terminals RC3 and RC4 of socket 23. Switching circuit 36 is actuated, i.e., closed, by transmitter generated pulses that have the proper phase relationship relative to the AC power. Terminals RC3 and RC4, an inductor L10, and a controlled rectifier SCR10 are connected in series across terminals RC1 and RC2, SCR10 being poled to conduct current from RC1 to RC2. A controlled rectifier SCR12, inductor L10, and terminals RC3 and RC4 are also connected in series between RC1 and RC2, SCR12 being poled to conduct current from RC2 to RC1. Thus, SCR10 and SCR12 are connected back-to-back in parallel with each other and in series with terminals RC3 and RC4 across RC1 and RC2. A resistor R19 is connected between RC3 and the gate electrode of SCR12. A resistor R20 and a capacitor C13 are each connected between the gate electrode of SCR12 and its cathode. The wiper arm of a window selecting switch S2 is connected by a window determining capacitor C10 to RC2. The stationary contacts of switch S2 are connected by window determining resistors R11, R12, R13, and R14, respectively, to RC3. A diode D10, a coupling diode D12, a coupling diode D13, and a capacitor C12 are connected in series between the wiper arm of switch S2 and the gate electrode of SCR10. A resistor R16 is connected in parallel with diode D10. A resistor R15 and a capacitor C11 are connected in series between RC3 and the junction of D10 and D12. A Zener diode ZR1 is connected between RC2 and the junction of D12 and D13. A resistor R17 is connected between RC2 and the junction of D13 and capacitor C12. A resistor R18 is connected between the cathode of SCR10 and its gate electrode. D10 is poled to conduct current toward the wiper arm of switch S2, D12 and D13 are poled to conduct current toward the gate electrode of SCR10, and ZR1 is poled to break down when the junction of D12 and D13 is positive with respect to RC2. The components in a typical embodiment of receiver 21 are the following values and types:

$R_{11}$ = 100 ohms
$C_{11}$ = 0.1 mf
$R_{12}$ = 2200 ohms
$C_{12}$ = 0.01 mf
$R_{13}$ = 4700 ohms
$C_{13}$ = 10 mf
$R_{14}$ = 10 K ohms
$C_{14}$ = 0.01 mf
$R_{15}$ = 1000 ohms
$L_{10}$ = 250 mh
$R_{16}$ = 33 K ohms
D10, D12, D13 = HEP R0170
$R_{17}$ = 33 K ohms
ZR1 = 9.1 volts
$R_{18}$ = 1000 ohms
SCR10, SCR12 = HEP R1218
$R_{19}$ = 47 K ohms
$R_{20}$ = 1000 ohms Briefly, the operation of the receiver is as follows. The receiver is enabled, i.e., capable of detecting transmitter generated pulses on the AC power line, in predetermined time slots or phase windows lagging the positive going zero crossings of the AC power in phase. The phase lag of the time slots is determined by the resistance-capacitance time constant of capacitor C10, and one of resistors R11 through R14 selected by selector switch S2, which comprises adjustment 26. If during the selected time slot a transmitter generated pulse appears on the AC power line, it will be coupled to the receiver at terminals RC1 and RC2, and transferred by means of a normally disabled pulse transmission path comprising resistor R15, capacitor C11, diodes D12 and D13, and capacitor C12 to the gate electrode of controlled rectifier SCR10. The pulse at the gate electrode of SCR10 renders it conductive, i.e., fires SCR10, thereby completing an electrical path between terminals RC4 and RC2. Completing the aforementioned electrical path couples appliance 24 to the AC power line. During the negative half cycles of the AC power following positive half cycles when SCR10 is conductive, SCR12 is rendered conductive, i.e., fires, and SCR 10 is non-conductive so that appliance 24 is connected to the AC power line for the entire AC power cycle period except for the initial phase lag before the time slot caused by the enabling circuit 37. As long as a transmitter generated pulse appears on the AC power line on alternate half cycles, i.e., every positive half cycle, and such pulse is detected by the receiver, the appliance remains coupled to the AC power line.

More specifically, the operation of the receiver is as follows. The portion of the receiver, i.e., circuit 37 that is coupled to the gate electrode of SCR10, provides a selectable time slot or phase window during which the receiver is enabled to detect a transmitter generated pulse on the AC power line. All pulses are noise outside the window are rejected by the receiver. A phase shift network comprising one of the resistors R11 through R14, selected by the select switch S2, and capacitor C10 provides a voltage at node 6 that lags the powerline voltage by a predetermined amount. This voltage serves to open and close the receiver phase window. As the powerline voltage passes through zero at the beginning of a positive half cycle, the voltage at node 6 is still negative; this voltage, coupled through R16, reverse biases D12 and disables the pulse transmission path to the gate electrode of SCR10. The receiver phase window is closed. A positive pulse coupled through R15 and C11 at this time will see a low impedance path through D10 and C10 and will not overcome the reverse bias on D12.

As the powerline voltage increases further the voltage at node 6 passes through zero and becomes positive. This voltage, coupled through R16 to node 7, forward biases D12, enables the pulse transmission path, and opens the phase window. The voltage at node 8 will begin to rise at the same rate as the voltage at node 6. When the voltage at node 8 reaches the forward breakdown of diode D13 further voltage changes at node 8 will be influenced by the voltage divider formed by R16 and R17. The phase window closes when the voltage at node 8 reaches the zener voltage of ZR1.

In FIG. 7, curves $V_6$, $V_7$, and $V_8$ represent the voltages at nodes 6, 7, and 8, respectively, from just before the phase window opens till after it closes. The ordinate is voltage amplitude and the abscissa is time. In FIG. 7, A represents the forward breakdown voltage of D12, B represents the forward breakdown voltage of D13, C represents the reverse breakdown voltage of zener diode ZR1, and D represents the voltage amplitude of the pulses passed through the enabling circuit. Once the window is open, a pulse coupled through R15 and C11 will cause the voltage at node 8 to increase, but node 8 is limited in amplitude to either the voltage at node 6 (through the action of D10 and D12) or to the zener voltage of ZR1, whichever is lower.

As shown in FIG. 7, the amplitude of the pulse passed through the enabling circuit will vary according to when the pulse occurs within the phase window. The amplitude will be zero at the boundaries of the window and will be maximum at the point at which the node 6 voltage equals the zener voltage of ZR1.

When the voltage at node 8, coupled from node 6 via R16 and D12, reaches the zener voltage of ZR1, the phase window is closed and the pulse transmission path is disabled. A positive pulse occurring at this time will see a low impedance across ZR1 and will not develop significant voltage at node 8. The switching characteristics of diode D12 allow a strong negative pulse to drive the voltage at node 8 momentarily negative; diode D13 prevents this transient from coupling through C12 to the gate electrode of SCR10.

Resistor R15 serves to form a voltage divider with C10 before the phase window opens and with ZR1 after it closes to increase the attenuation of pulses occurring outside the phase window. Capacitor C11 is selected to pass the pulses received from the transmitter, but to block the normal AC powerline voltage.

Capacitor C12 couples the pulses passed through the enabling circuit, which consist of high frequency components, to the gate electrode of SCR10 to render it conductive, but blocks the low frequency components of the enabling voltage, i.e., the components generated by the line voltage. Resistor R18 provides the low impedance gate to cathode connection frequently specified for sensitive gate SCR's to prevent self-triggering at high anode voltages. Inductance L10 isolates the switching transients generated by SCR10 and SCR12 from the AC power distribution network to prevent propagation of radio frequency interference.

When a transmitter generated pulse is detected and SCR10 is rendered conductive, the resulting voltage drop across RC3 and RC4 charges capacitor C13 through resistors R19 and R20 so the gate electrode of SCR12 becomes positive. Capacitor C13 maintains this positive voltage on the gate electrode of SCR12 for a sufficient time after the following negative going zero crossing of the AC power so as to render SCR12 conductive. Thus appliance 24 will be energized for each entire negative half cycle of the AC power after SCR10 is rendered conductive.

The time (referenced to the positive going zero crossings) at which the window opens, i.e., the time in which the receiver becomes enabled, is determined by the resistance of the one resistor R11 to R14 selected by select switch S1, and the capacitor C10. The duration of the enabled period is determined primarily by the reverse breakdown voltage of zener diode ZR1. Thus, a plurality of appliances coupled to the power line by respective receivers can be individually controlled by a single transmitter; the receivers are all adjusted to have a different time slot or window and the phase of the transmitter generated pulses is simply adjusted to lie within the window of the receiver connected to the selected appliance. The combination of transmitters and receivers operating together can be programmed by simply adjusting them to operate on the same channel.

The window is positioned early enough in time so as to minimize the influence of noise generated on the power line by such devices as lamp dimmer switches and motor speed controls, preferably within 10° after the AC power zero crossings. Typically, most lamp dimmer switches turn on long after the zero crossings of the AC power. Thus, setting of the windows soon after the zero crossings isolates the receiver from such noise appearing on the power line.

Alternatively, the selectable resistance values that determine the time at which the transmitter generated pulses occur can be provided by means of a potentiometer so as to have continuous, rather than discrete, control over the pulse phase. Similarly, a potentiometer can be used in the receiver to provide continuous control of the placement of the phase window.

Figure 6:
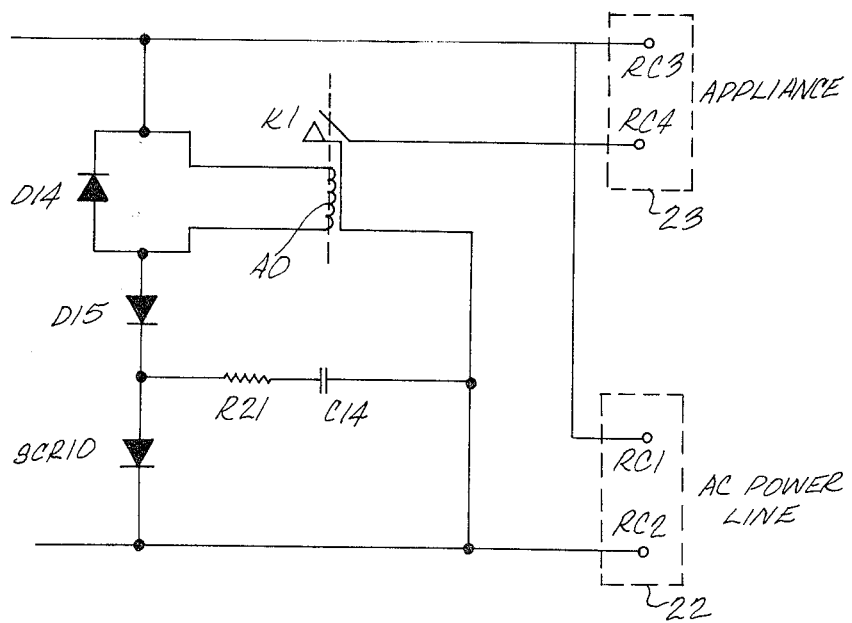
FIG. 6 is a circuit schematic diagram of an alternate embodiment of a switch closing during the half cycles of the alternating current following transmitter generated pulses.

An alternative embodiment of the circuit 36 of FIG. 5 is shown in FIG. 6. Circuitry that includes a relay coil 40 and associated relay contacts K1 is used in lieu of SCR12. Relay coil 40, a diode D15, and SCR10 are connected in series between RC3 and RC2. A diode D14 is connected in parallel with coil 40. Relay contacts K1 connect RC2 to RC4. A resistor R21 and a capacitor C14 are connected in series from the junction of SCR10 and D15 to RC2. D14 is poled opposite to SCR10 and D15 is poled in the same direction as SCR10.

Upon detection of a transmitter generated pulse on the power line, SCR10 is rendered conductive, and the relay coil 40 is energized, thereby closing relay contacts K1, coupling the appliance 24 to the AC power line.

During the negative half cycle diode D14 provides a current path for the relay coil energizing current, thereby assisting the relay contacts to remain closed and provide continuous application of power to the appliance. Diode D15, resistor R21 and capacitor C14 provide sufficient current in order to turn on SCR10 when a pulse is applied to its gate.

While the basic principle of this invention has been herein illustrated along with the embodiments shown, it will be appreciated by those skilled in the art that variations in the disclosed arrangement, both as to its details and the organization of such details, may be made without departing from the spirit and scope thereof. Accordingly, it is intended that the foregoing disclosure and the showings made in the drawings will be considered only as illustrative of the principles of the invention, and not construed in a limiting sense. For example, instead of applying power to the appliance when transmitter generated pulses are applied to the power line, power could be applied in the absence of such pulses. Or, instead of controlling the power in on/off fashion, the power applied to the appliance could be controlled in an analog fashion depending on the modulation of the transmitter generated pulses, e.g., the larger the phase lag of such pulses, the greater the applied power. In any case, power is transferred from the line to the appliance as a function of the characteristic, preferably phase, of the transmitter generated pulses. Although it is preferable to generate pulses at the transmitter on alternate half cycles of the AC power to increase the number of channels, these pulses could be generated on each half cycle with appropriate modifications of the transmitter and receiver. As disclosed herein, the transmitter issues pulses whenever the AC power circuit to which it is connected is energized. The transmitter could, however, incorporate a switch for manual operation, or incorporate means for responding to temperature, light, or another external stimulus.

What is claimed is:

1. Apparatus for remotely controlling an electrical appliance connected across an alternating current power line, the apparatus comprising:

a transmitter having an output adapted to be connected across an alternating current power line at a point remote from an appliance to be controlled, the transmitter including a capacitor, an inductor, a controlled rectifier having an anode, a cathode, and a gate electrode, means for connecting the capacitor, the inductor, and the anode and cathode of the controlled rectifier in series across the output, means during alternating current half cycles of one polarity for charging the capacitor, means during alternating current half cycles of the other polarity for firing the controlled rectifier rapidly to discharge the capacitor, and means for holding the controlled rectifier in a conducting state during the remainder of the alternating current half cycle after the controlled rectifier fires; and a receiver adapted to be connected across an alternating current power line to couple the line to an appliance to be controlled, the receiver including means responsive to control pulses generated by the transmitter for controlling the transfer of power from the line to the appliance.

2. The apparatus of claim 1, in which the charging means comprises a first diode connected between the cathode and the gate electrode and a second diode connected between the gate electrode and the anode, the first and second diodes being poled opposite to the controlled rectifier.

3. The apparatus of claim 2, in which the firing means comprises a timing resistor and a timing capacitor connected in series across the output with one terminal of the timing capacitor connected to the cathode of the controlled rectifier, and a coupling capacitor and a coupling diode poled to conduct current toward the gate electrode connected in series between the junction of the timing resistor and the timing capacitor and the gate electrode.

4. The apparatus of claim 3, in which the holding means comprises a holding resistor connected in parallel with the coupling capacitor.

5. The apparatus of claim 1, additionally comprising means for coupling the output of the transmitter to the power line.

6. The apparatus of claim 5, in which the coupling means comprises a resistor connected in series with the output of the transmitter across the power line.

7. The apparatus of claim 3, additionally comprising a resistor connected between the gate electrode and the cathode.

8. Apparatus for remotely controlling an electrical appliance connected across an alternating current power line, the apparatus comprising:

a transmitter having an output adapted to be connected across an alternating current power line at a point remote from an appliance to be controlled, the transmitter including a controlled rectifier having an anode, a cathode, and a gate electrode, means responsive to the firing of the controlled rectifier for generating a control pulse, the control pulse generating means comprising a first capacitor and an inductor connected in series with the anode and cathode of the controlled rectifier across the output of the transmitter, a first diode connected between the cathode and the gate electrode, and a second diode connected between the gate electrode and the anode, the first and second diodes being poled opposite to the controlled rectifier, a phase shifting network having an output and an input connected across the output of the transmitter, and a second coupling capacitor and a third coupling diode poled to conduct current toward the gate electrode connected in series between the output of the phase shifting network and the gate electrode; and a receiver adapted to be connected across an alternating current power line to couple the line to an appliance to be controlled, the receiver including means responsive to control pulses generated by the transmitter for controlling the transfer of power from the line to the appliance.

9. Apparatus for remotely controlling an electrical appliance connected across an alternating current power line, the apparatus comprising:

a transmitter having an output adapted to be connected across an alternating current power line at a point remote from an appliance to be controlled, the transmitter including means for generating control pulses at a rate of one every alternating current cycle, the phase of such control pulses relative to the alternating current of the line having a predetermined value; and a receiver having an input adapted to be connected across an alternating current power line to couple the line to an appliance to be controlled, the receiver including a controlled rectifier having an anode and a cathode connected in series with the appliance across the line and having a gate electrode, the controlled rectifier firing to conduct unilaterally during the remainder of a half cycle of alternating current when a control pulse from the transmitter is applied to the gate electrode, a normally disabled transmission path coupling the input of the receiver to the gate electrode, the transmission path having a control node and bring enabled when the control node reaches a predetermined potential, a switching circuit adapted to be connected in series with the appliance across the line and means for closing the switching circuit during half cycles of alternating current immediately following half cycles in which control pulses are applied to the gate electrode, a coupling diode and a capacitor connected in series between the control node and the gate electrode, the coupling diode being poled to conduct current toward the gate electrode and a zener diode connected between the junction of the coupling diode and the capacitor and the cathode of the controlled rectifier, the zener diode being poled for reverse breakdown when the voltage at the control node reaches a predetermined maximum value, and means responsive to alternating current for enabling the transmission path during a predetermined period of time defining a phase window in each cycle of the alternating current for passage of a control pulse to the gate electrode, the enabling means comprising a delay circuit coupling the receiver input to the control node so as to transmit alternating current applied to the receiver input in phase lagging relationship to the control node.

10. The apparatus of claim 9, in which the generating means generates a control pulse during alternating current half cycles of one polarity without generating a control pulse during alternating current half cycles of the other polarity and the controlled rectifier of the receiver opens responsive to zero crossings from the other polarity to the one polarity.

11. The apparatus of claim 10, in which the switching circuit comprises an additional controlled rectifier having an anode and a cathode adapted to be connected in series with the appliance across the line in back-to-back relationship with the first named controlled rectifier and a gate electrode, the additional controlled rectifier firing to conduct unilaterally in the opposite direction from the first named controlled rectifier when a given voltage level is applied to its gate electrode, and means responsive to the firing of the first named controlled rectifier for applying the given voltage level to the gate electrode of the additional controlled rectifier.

12. The apparatus of claim 9, additionally comprising means for adjusting the delay circuit to change the phase lagging relationship.

13. Apparatus for remotely controlling an electrical appliance connected across an alternating current power line, the apparatus comprising:

a transmitter having an output adapted to be connected across an alternating current power line at a point remote from an appliance to be controlled, the transmitter including means for generating control pulses at a rate of one every alternating current cycle, the phase of such control pulses relative to the alternating current of the line having a predetermined value; and a receiver having an input adapted to be connected across an alternating current power line to couple the line to an appliance to be controlled, the receiver including a controlled rectifier having an anode and a cathode connected in series with the appliance across the line and having a gate electrode to which the input of the receiver is coupled such that the controlled rectifier fires to conduct unilaterally during the remainder of a half cycle of alternating current when the control pulse is applied to the gate electrode, a switching circuit adapted to be connected in series with the appliance across the line and means for closing the switching circuit during half cycles of alternating current immediately following half cycles in which control pulses are applied to the gate electrode.

14. The apparatus of claim 13, in which the switching circuit comprises an additional controlled rectifier having an anode and a cathode adapted to be connected in series with the appliance across the line in back-to-back relationship with the first named controlled rectifier and a gate electrode, the additional controlled rectifier firing to conduct unilaterally in the opposite direction from the first named controlled rectifier when a given voltage level is applied to its gate electrode, and means responsive to the firing of the first named controlled rectifier for applying the given voltage level to the gate electrode of the additional controlled rectifier.

15. Apparatus for remotely controlling an electrical appliance connected across an alternating current power line, the apparatus comprising:

a transmitter having an output adapted to be connected across an alternating current power line at a point remote from an appliance to be controlled, the transmitter including a capacitor, a controlled rectifier having an anode, a cathode, and a gate electrode, means for connecting the capacitor and the anode and cathode of the controlled rectifier in series across the output, means during alternating current half cycles of one polarity for charging the capacitor, means during alternating current half cycles of the other polarity for firing the controlled rectifier rapidly to discharge the capacitor across the transmitter output, means for holding the controlled rectifier in a conducting state during the remainder of the alternating current half cycle after the controlled rectifier fires, and means for shaping the pulse produced when the controlled rectifier fires; and a receiver adapted to be connected across an alternating current power line to couple the line to an appliance to be controlled, the receiver including means responsive to control pulses generated by the transmitter for controlling the transfer of power from the line to the appliance.

16. The apparatus of claim 15, in which the wave form shaping means comprises an inductor in series with the capacitor and the anode and cathode of a controlled rectifier.

17. The apparatus of claim 16, in which the wave form shaping means additionally comprises a capacitor connected across the output of the transmitter.

18. A transmitter for remotely controlling an electrical appliance connected across an alternating current power line, the transmitter comprising:
- an output adapted to be connected across an alternating current power line at a point remote from an appliance to be controlled;
- a capacitor;
- an inductor;
- a controlled rectifier having an anode, a cathode, and a gate electrode;
- means for connecting the capacitor, the inductor, and the anode and cathode of the controlled rectifier in series across the output;
- means during alternating current half cycles of one polarity for charging the capacitor;
- means during alternating current half cycles of the other polarity for firing the controlled rectifier rapidly to discharge the capacitor; and
- means for holding the controlled rectifier in a conducting state during the remainder of the alternating current half cycle after the controlled rectifier fires.

19. A receiver for remotely controlling an electrical appliance connected across an alternating current power line responsive to a received pulse, the receiver comprising:
- an input adapted to be connected across an alternating current power line to couple the line to an appliance to be controlled;
- a switching circuit having end terminals adapted to be connected in series with an appliance to be controlled across an alternating current power line, the switching circuit having a gating electrode closing responsive to application of a received pulse to the gate electrode and opening responsive to a following zero crossing during each alternating current cycle;
- a normally disabled transmission path coupling the input of the receiver to the gate electrode, the transmission path comprising a control node and first and second coupling diodes connected in series between the control node and the gate electrode, the coupling diodes being poled to conduct current toward the gate electrode;
- means for back biasing the first coupling diode during a first interval at the beginning of alternating current half cycles;
- means for back biasing the second coupling diode during a second interval at the end of alternating current half cycles; and
- means for forward biasing both coupling diodes during an interval between the first and second intervals.

20. Apparatus for remotely controlling an electrical appliance connected across an alternating current power line, the apparatus comprising:
- a transmitter having an output adapted to be connected across an alternating current power line at a point remote from an appliance to be controlled, the transmitter including means for generating control pulses at a rate of one every alternating current cycle, the phase of such control pulses relative to the alternating current of the line having a predetermined value; and
- a receiver having an input adapted to be connected across an alternating current power line to couple the line to an appliance to be controlled, the receiver including a switching circuit adapted to be connected in series with an appliance to be controlled across an alternating current line, the switching circuit having a gate electrode closing responsive to application of a single control pulse to the gate electrode, and opening responsive to a following zero crossing during each alternating current cycle, a normally disabled transmission path coupling the input of the receiver to the gate electrode, the transmission path comprising a control node and a first coupling diode and a second coupling diode connected in series between the control node and the gate electrode, the coupling diodes being poled to conduct current toward the gate electrode, and means responsive to alternating current for enabling the transmission path during a predetermined period of time defining a phase window in each cycle of the alternating current for passage of a control pulse to the gate electrode, the enabling means comprising means for back biasing the first coupling diode before the phase window, means for clamping the junction of the coupling diodes to a reference potential after the phase window, and means for forward biasing both coupling diodes during the phase window to enable the transmission path.

21. The apparatus of claim 20, in which the switching circuit comprises a controlled rectifier and the end electrodes are the anode and cathode, respectively, of the controlled rectifier, the means for back biasing the first coupling diode comprising a series resistor and a capacitor in series across the receiver input with one terminal of the capacitor connected to the cathode of the controlled rectifier, a third diode connected between the control node and the other terminal of the capacitor in back-to-back relationship with the first and second coupling diodes, a shunt resistor connected in parallel with the third diode, and means for coupling to the control node the terminal of the series resistor connected to the receiver input.

22. The apparatus of claim 21, in which the means for clamping the coupling diodes comprises a zener diode connected between the junction of the coupling diodes and the cathode of the controlled rectifier, the zener diode being poled for reverse breakdown when the voltage of the control node reaches a predetermined maximum value.

23. The apparatus of claim 22, in which the transmission path further comprises a coupling capacitor connected between the second coupling diode and the gate electrode.

24. The apparatus of claim 23, additionally comprising a low impedance resistor connected between the gate electrode and the cathode.

25. The apparatus of claim 24, additionally comprising a voltage dividing resistor connected between the junction of the second coupling diode and the coupling capacitor and the cathode.

26. The apparatus of claim 25, in which the transmission path additionally comprises a resistor and a capacitor in series between the input of the receiver and the control node.

* * * * *

UNITED STATES PATENT AND TRADEMARK OFFICE
CERTIFICATE OF CORRECTION

PATENT NO. : 4,329,678
DATED : May 11, 1982
INVENTOR(S) : Jerry M. Hatfield

It is certified that error appears in the above-identified patent and that said Letters Patent are hereby corrected as shown below:

Column 5, line 20, "of" should read --or--;
        lines 60-68 should be in two columns as shown in text of application.

Column 6, lines 1-5 should be in two columns as shown in text of application.

Column 9, line 11 "are" should read --or--.

Column 13, line 17 "bring" should read --being--.

Column 8, lines 25-42 should be in two columns as shown in text of application.

Signed and Sealed this

Twenty-second Day of February 1983

[SEAL]

Attest:

GERALD J. MOSSINGHOFF

Attesting Officer     Commissioner of Patents and Trademarks